United States Patent
Feng et al.

(10) Patent No.: US 9,420,484 B2
(45) Date of Patent: Aug. 16, 2016

(54) METHOD AND DEVICE FOR UPDATING COORDINATED MULTI-POINT TRANSMISSION SET

(71) Applicant: Huawei Technologies Co., Ltd., Shenzhen (CN)

(72) Inventors: Li Feng, Shenzhen (CN); Jun Chen, Shenzhen (CN); Xiaoxiao Zheng, Shenzhen (CN); Dong Chen, Shenzhne (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 725 days.

(21) Appl. No.: 13/682,189

(22) Filed: Nov. 20, 2012

(65) Prior Publication Data

US 2013/0077521 A1 Mar. 28, 2013

Related U.S. Application Data

(63) Continuation of application No. PCT/CN2011/074219, filed on May 18, 2011.

(30) Foreign Application Priority Data

May 20, 2010 (CN) .......................... 2010 1 0184069

(51) Int. Cl.
*H04W 24/10* (2009.01)
*H04W 36/00* (2009.01)
(Continued)

(52) U.S. Cl.
CPC .......... *H04W 24/10* (2013.01); *H04W 36/0083* (2013.01); *H04B 7/024* (2013.01); *H04W 36/18* (2013.01); *H04W 72/08* (2013.01)

(58) Field of Classification Search
CPC . H04W 24/10; H04W 36/0083; H04W 36/18; H04W 72/08; H04W 7/024
USPC ............ 370/329, 252; 455/452.1, 456.1, 436, 455/63.1, 67.11
See application file for complete search history.

(56) References Cited

U.S. PATENT DOCUMENTS 6,233,455 B1  5/2001  Ramakrishna et al.
8,614,981 B2 * 12/2013  Mallik et al. .................. 370/329
(Continued)

FOREIGN PATENT DOCUMENTS

CN  101931985 A  12/2010
CN  101931993 A  12/2010
(Continued)

OTHER PUBLICATIONS

Written Opinion of the International Searching Authority issued in corresponding PCT Patent Application No. PCT/CN2011/074219, mailed Sep. 1, 2011.
International Search Report issued in corresponding PCT Patent Application No. PCT/CN2011/074219, mailed Sep. 1, 2011.
(Continued)

*Primary Examiner* — Kwang B Yao
*Assistant Examiner* — Syed M Bokhari
(74) *Attorney, Agent, or Firm* — Brinks Gilson & Lione (57) ABSTRACT

A method and a device for updating a coordinated multipoint (CoMP) transmission set are provided by the embodiments of the present invention. The embodiments of the present invention can update the CoMP transmission set, and adjust the CoMP coordinated cells flexibly, which is conducive to further improving the overall performance of the cell and the performance of the users at the edge of the cell.

14 Claims, 6 Drawing Sheets

(51) Int. Cl.
 *H04B 7/02* (2006.01)
 *H04W 36/18* (2009.01)
 *H04W 72/08* (2009.01)

(56) References Cited

U.S. PATENT DOCUMENTS

| | | | |
|---|---|---|---|
| 2010/0103821 A1 | 4/2010 | Palanki et al. | |
| 2010/0240372 A1* | 9/2010 | Wu | 455/436 |
| 2010/0304682 A1* | 12/2010 | Choi | H04B 7/024 455/63.1 |
| 2010/0322171 A1* | 12/2010 | Dekorsy et al. | 370/329 |
| 2010/0323720 A1* | 12/2010 | Jen | 455/456.1 |
| 2011/0098054 A1* | 4/2011 | Gorokhov et al. | 455/452.1 |
| 2011/0105043 A1* | 5/2011 | Wu | 455/67.11 |

FOREIGN PATENT DOCUMENTS

| | | |
|---|---|---|
| WO | WO 2009/066726 A1 | 5/2009 |
| WO | WO 2009066726 A1 | 5/2009 |
| WO | WO 2010039066 A1 | 4/2010 |

OTHER PUBLICATIONS

Samsung, "Design Considerations for COMP Joint Transmission" Agenda Item 15.2, 3GPP TSG RAN WG1 Meeting #56bis. Seoul, Korea, Mar. 23-27, 2009. R1-091232.

LG Electronics, "Cell Clustering and Feedback for CoMP" Agenda Item 15.2, 3GPP TSG RAN WG1 Meeting #56b. Seoul, Korea, Mar. 23-27, 2009. R1-091189.

Catt, "Impact of CoMP on Control Plane" Agenda Item 7.5, 3GPP TSG RAN WG2 Meeting #66bis. Los Angeles, USA, Jun. 29-Jul. 3, 2009. R2-093727.

$3^{rd}$ Generation Partnership Project, "Radio Resource Control (RRC); Protocol specification" 3GPP TS 25.331 V7.16.0, Mar. 2010.

Extended European Search Report issued in corresponding European Patent Application No. 11782940.8, mailed Jan. 28, 2013.

Catt, "Impact of CoMP on Control Plane" Agenda Item 7.5. 3GPP TSG RAN WG2 Meeting #67bis, Miyazaki, Japan, Oct. 12-16, 2009. R2-095488.

Huawei, "System Performance Evaluation for Uplink CoMP" Agenda 15.2, 3GPP TSG RAN WG1 Meeting #56bis, Seoul, Korea, Mar. 23-27, 2009. R1-091618.

Office Action issued in corresponding Chinese Patent Application No. 201010184069.6, mailed Jul. 5, 2013, 15 pages.

\* cited by examiner

HS-DSCH order:

FIG. 6a

HS-DSCH order:

METHOD AND DEVICE FOR UPDATING COORDINATED MULTI-POINT TRANSMISSION SET

CROSS-REFERENCE TO RELATED APPLICATIONS

This application is a continuation of International Application No. PCT/CN2011/074219, filed on May 18, 2011 which claims priority to Chinese Patent Application No. 201010184069.6, filed on May 20, 2010, both of which are hereby incorporated by reference in their entireties.

FIELD OF TECHNOLOGY

The present invention relates to the field of mobile communication, and in particular, to a method and a device for updating a coordinated multi-point transmission (Coordinated Multi-Point transmission, CoMP) transmission set.

BACKGROUND

In the CoMP technology, downlink CoMP transmission is a technology of sending data from multiple geographically distributed transmitters to a user equipment (User Equipment, UE).

A network node in a CoMP system includes: a NodeB (NodeB) and at least one Access Point (AP). An access point (Access Point, AP) is a node that includes a radio frequency transceiver, and one or more antenna elements may be configured on the AP. Multiple access points geographically distributed and connected to a network device may coordinate to transmit data. The relationship between an AP and a traditional cell may be: one cell includes one or more APs.

A CoMP cooperation set of a UE includes cells or access points capable of taking concurrent part in sending data to the UE. The CoMP configurations corresponding to the cells or access points in the CoMP cooperation set are not necessarily activated. That is, the cells or access points do not necessarily coordinate to send data to the UE currently.

Currently, the technology of updating the CoMP transmission set is lacking. Therefore, the practice of using the CoMP technology to improve the overall performance of the cell and the performance of the users at the edge of the cell is restricted.

SUMMARY

Embodiments of the present invention provide a method and a device for updating a CoMP transmission set.

An embodiment of the present invention provides a method for updating a CoMP transmission set, including:

sending, by an RNC, a 1k criterion to a user equipment (UE);

receiving, by the RNC, a measurement report sent by the UE when the 1k criterion is fulfilled; and updating, by the RNC, a CoMP transmission set of the UE according to the measurement report, where the 1k criterion includes any one of the following conditions for the UE to send the measurement report: quality of a cell belonging to an active set but not belonging to a CoMP transmission set is greater than quality of at least one cell in the CoMP transmission set; or, the quality of the cell belonging to the active set but not belonging to the CoMP transmission set is greater than a mean value or weighted mean value of quality of at least two cells in the CoMP transmission set.

A network device provided in another embodiment of the present invention includes a sending unit. The sending unit is configured to send an activation indication and/or a deactivation indication to a user equipment (UE). The activation indication serves to activate CoMP configuration of at least one cell in CoMP configuration of the UE; and the deactivation indication serves to deactivate CoMP configuration of at least one cell in the CoMP configuration of the UE.

A network device provided in another embodiment of the present invention includes a transceiver unit and a processing unit. The transceiver unit is configured to send a 1k criterion to a user equipment (UE), and receive a measurement report sent by the UE when the 1k criterion is fulfilled; and the processing unit is configured to update a coordinated multi-point (CoMP) transmission set of the UE according to the measurement report received by the transceiver unit.

The 1k criterion includes any one of the following conditions for the UE to send the measurement report: quality of a cell belonging to an active set but not belonging to a CoMP transmission set is greater than quality of at least one cell in the CoMP transmission set; or, the quality of the cell belonging to the active set but not belonging to the CoMP transmission set is greater than a mean value or weighted mean value of quality of at least two cells in the CoMP transmission set.

Embodiments of the present invention can update the CoMP transmission set, and adjust the CoMP coordinated cells flexibly, which is conducive to further improving the overall performance of the cell and the performance of the users at the edge of the cell. Moreover, the embodiments of the present invention can activate or deactivate the CoMP configuration of one or more cells of the UE, thereby preventing the terminal from monitoring the downlink channels of all coordinated cells all the time and reducing the power consumption of the terminal.

DETAILED DESCRIPTION

The following detailed description is given in conjunction with the accompanying drawings in order to provide a thorough understanding of the technical solutions in the embodiments of the present invention. Evidently, the drawings and the detailed description are merely representative of particular embodiments of the present invention rather than all embodiments. Based on the embodiments of the present invention, all other embodiments obtained by persons of ordinary skill in the art without making any creative effort shall fall within the protection scope of the present invention.

In embodiments of the present invention, a CoMP transmission set of a UE may be a subset of a CoMP cooperation set. Optionally, a transmission set of a UE includes the cell whose CoMP configuration is activated in the CoMP cooperation set of the UE, namely, the cell that currently cooperates in sending data to the UE. Optionally, the transmission set of the UE includes the cell whose CoMP configuration is activated in the CoMP cooperation set of the UE and a current serving cell of the UE.

A method for updating a CoMP transmission set is provided in an embodiment of the present invention. In this embodiment, a radio network controller (Radio Network Controller, RNC) sends a 1k criterion to the UE. Upon receiving a measurement report sent by the UE when the 1k criterion is fulfilled, the RNC updates the CoMP transmission set of the UE.

In this embodiment, the 1k criterion may be regarded as a criterion for the UE to send the measurement report. For example, the 1k criterion is: the UE sends the measurement report if the quality of the cell belonging to an active set but not belonging to the CoMP transmission set is greater than the quality of at least one cell in the CoMP transmission set. In another example, the 1k criterion is: the UE sends the measurement report if the quality of the cell belonging to the active set but not belonging to the CoMP transmission set is greater than the mean value or weighted mean value of the quality of at least two cells in the CoMP transmission set. In another example, the 1k criterion is: the UE sends the measurement report if the quality of the cell belonging to the cooperation set but not belonging to the CoMP transmission set is greater than the quality of at least one cell in the CoMP transmission set. In another example, the 1k criterion is: the UE sends the measurement report if the quality of the cell belonging to the cooperation set but not belonging to the CoMP transmission set is greater than the mean value or weighted mean value of the quality of at least two cells in the CoMP transmission set.

The measurement report in this embodiment may include cell quality and a cell identifier of at least one cell fulfilling the 1k criterion, or cell quality and a cell index of at least one cell fulfilling the 1k criterion. The measurement report may further include cell quality and a cell identifier of at least one cell in the current CoMP transmission set, or cell quality and a cell index of at least one cell in the current CoMP transmission set. The cell quality may be: received signal code power (CPICH RSCP), or chip power spectrum density (CPICH Ec/No), or path loss (CPICH PathLoss), and so on. If the UE detects/knows the cell quality of a cell which is expressed in more than one form, the UE may send a measurement report when all or part of the forms of the cell quality fulfill the 1k criterion.

The 1k criterion in this embodiment may be regarded as a criterion for the RNC to update the CoMP transmission set. That is, fulfillment of the 1k criterion triggers the UE to send the measurement report. The measurement report triggers the RNC to judge whether the CoMP transmission set of the UE needs update, and/or how to update the CoMP transmission set of the UE. For example, the RNC's judging whether the CoMP transmission set of the UE needs update may include: when the QoS of the current service of the UE fulfills a predefined requirement or when the cell quality of the cell fulfilling the 1k criterion reaches a predefined threshold, the RNC determines it necessary to update the CoMP transmission set. In another example, when the UE supports the CoMP mode and when the cell fulfilling the 1k criterion also supports the CoMP mode, the RNC determines it necessary to update the CoMP transmission set.

In this embodiment, the RNC may update the CoMP transmission set of the UE in many ways. For example, the RNC adds a cell into the current CoMP transmission set of the UE, or the RNC deletes a low-quality cell from the current CoMP transmission set of the UE when adding a cell into the current CoMP transmission set of the UE. The method for updating the CoMP transmission set can adjust the CoMP coordinated cells flexibly, and is conducive to further improving the overall performance of the cell and the performance of the users at the edge of the cell. Optionally, after the RNC determines it necessary to update the locally stored CoMP transmission set of the UE, by sending the updated CoMP transmission set or the CoMP configuration corresponding to the updated CoMP transmission set, the RNC updates the CoMP transmission set of the NodeB and/or UE application.

Also, for example, the RNC pre-configures the UE's CoMP configuration for the NodeB and the UE. The CoMP cooperation set corresponding to the CoMP configuration includes one or more cells capable of serving as coordinated cells. When the CoMP configuration corresponding to the cell is not activated, namely, when no cell sends data to the UE currently as a coordinated cell, the RNC may inform the NodeB to activate the CoMP configuration corresponding to one or more cells in the CoMP cooperation set of the UE, and therefore, the cell with activated CoMP configuration sends data to the UE as a coordinated cell, namely, the cell with activated CoMP configuration is added into the CoMP transmission set of the UE. In this way, the CoMP transmission set of the UE is updated. Optionally, the RNC informs the NodeB to deactivate the CoMP configuration corresponding to one or more cells in the CoMP transmission set of the UE, and therefore, the cell with deactivated CoMP configuration does not send data to the UE as a coordinated cell any longer, namely, the cell with deactivated CoMP configuration is deleted from the CoMP transmission set of the UE. In this way, the CoMP transmission set of the UE is updated. The method for updating the CoMP transmission set can adjust the CoMP coordinated cells flexibly, and reduce the power consumption of the terminal.

Figure 1:
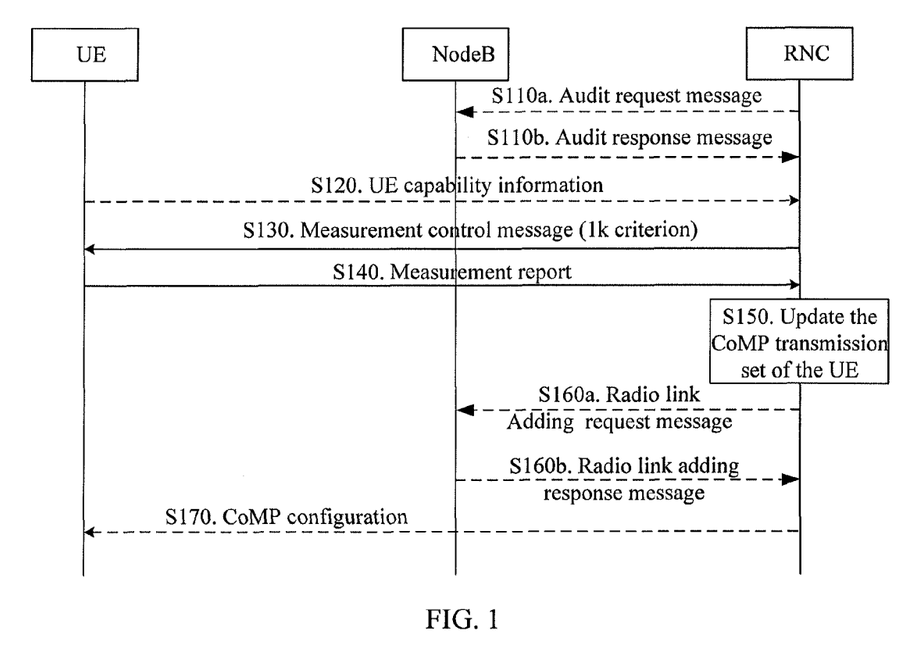
FIG. 1 is a flowchart of an update method according to an embodiment of the present invention.

As shown in FIG. 1, an embodiment of the present invention provides a method for updating a CoMP transmission set. The method in this embodiment may include the following steps:

S110. an RNC obtains CoMP capability information of a NodeB in an audit process.

For example, the RNC sends an audit request message to the NodeB (S110a), and receives an AUDIT RESPONSE message sent by the NodeB (S110b), where the AUDIT RESPONSE message carries the CoMP capability information of the NodeB.

The CoMP capability information of the NodeB may include an indication about whether the NodeB supports the CoMP mode. For example, a 1-bit indication whose value is 0 indicates that the NodeB does not support the CoMP mode.

When the NodeB supports the CoMP mode, for example, when the indication bit is 1, the CoMP capability information of the NodeB may include a cell identifier or a cell index of a coordinated cell of the local cells of the NodeB that connected to the UE, and therefore, the RNC knows which cells are suitable for coordinating with the local cell of the NodeB.

S120. the RNC obtains the CoMP capability information of the UE.

For example, the RNC receives UE CAPABILITY INFORMATION (UE CAPABILITY INFORMATION) sent by the UE. The UE CAPABILITY INFORMATION includes the CoMP capability information of the UE.

The CoMP capability information of the UE may include an indication about whether the UE supports the CoMP mode. For example, a 1-bit indication whose value is 1 indicates that the UE supports the CoMP mode.

S130. the RNC sends a MEASUREMENT CONTROL message (MEASUREMENT CONTROL) to the UE. The MEASUREMENT CONTROL message includes a 1k criterion.

Optionally, the 1k criterion includes any one of the following conditions for sending a measurement report (the conditions are briefly known as 1k events):

(1) The quality of the cell belonging to the active set of the UE but not belonging to the CoMP transmission set of the UE is greater than the quality of any one cell in the CoMP transmission set of the UE.

(2) The quality of the cell belonging to the active set of the UE but not belonging to the CoMP transmission set of the UE is greater than the quality of the cell with lowest signal quality in the CoMP transmission set of the UE.

(3) The quality of the cell belonging to the active set of the UE but not belonging to the CoMP transmission set of the UE is greater than the mean value of quality of at least two cells in the CoMP transmission set of the UE.

(4) The quality of the cell belonging to the active set of the UE but not belonging to the CoMP transmission set of the UE is greater than the weighted mean value of quality of at least two cells in the CoMP transmission set of the UE.

The 1k criteria provided in other embodiments of the present invention are also applicable to this embodiment, and will not be described here.

Optionally, the MEASUREMENT CONTROL message for informing the UE to perform measurement (such as common-frequency measurement) further includes time information. The time information indicates the duration of fulfilling the 1k criterion before the UE sends the measurement report, namely, indicates how long the 1k criterion needs to be fulfilled before the UE sends the measurement report.

S140. the UE sends the measurement report to the RNC when the 1k criterion is fulfilled.

Optionally, if the UE receives the time information, the UE sends the measurement report when the UE measures and finds that a cell has fulfilled the 1k criterion for the time corresponding to the foregoing time information.

The measurement report sent by the UE includes the cell quality of all or part of the cells fulfilling the 1k criterion, and the cell identifiers or cell index of such cells.

Optionally, the measurement report further includes: cell quality and cell identifier (or cell index) of at least one cell in the current CoMP transmission set of the UE, and the cell quality of the cell is less than the cell quality of those cells whose quality fulfills the 1k criterion. In this way, the RNC may delete low-quality cells in the current CoMP transmission set of the UE according to the measurement result reported by the UE.

S150. the RNC receives the measurement report and updates the CoMP transmission set of the UE.

Optionally, the RNC decides whether to update the CoMP transmission set of the UE according to one or more factors such as cell capability, QoS required by the service, cell quality, number of cells in the transmission set, or upper limit of the number, and, if so, the RNC updates the locally stored CoMP transmission set of the UE.

For example, if the cell fulfilling the 1k criterion supports the CoMP mode, or the QoS of the current service of the UE fulfills a predefined threshold, or the cell quality of the cell fulfilling the 1k criterion reaches a predefined threshold, the RNC adds the cell into the CoMP transmission set.

In another example, the RNC imposes an upper limit of the number of cells in the CoMP transmission set. The RNC judges whether the number of cells in the current CoMP transmission set reaches the upper limit of the number of cells; if not, the RNC adds the cell fulfilling the 1k criterion into the CoMP transmission set, and makes the number of cells in the updated CoMP transmission set not exceed the upper limit of the number of cells. If the number of cells in the current CoMP transmission set of the UE reaches the upper limit of the number of cells, the RNC may delete some cells such as low-quality cells from the CoMP transmission set, and adds the cell fulfilling the 1k criterion into the CoMP transmission set.

In another example, through the measurement report, the RNC knows which cells have low quality in the CoMP transmission set of the UE, and the RNC may delete all or part of the low-quality cells from the CoMP transmission set.

If the RNC deletes a cell from the CoMP transmission set of the UE, the RNC may further delete the cell from the CoMP cooperation set and/or the active set of the UE.

S160. the RNC negotiates with the NodeB about the CoMP configuration corresponding to the updated CoMP transmission set (namely, new CoMP configuration).

For example, when the RNC decides to add a cell into the CoMP transmission set of the UE in step S150 (and possibly has not updated the locally stored CoMP transmission set of the UE), the RNC may negotiate with the NodeB about the CoMP configuration corresponding to the updated CoMP transmission set through a radio link setup process, or a radio link reconfiguration process, or a radio link adding process. For example, when the RNC decides to update the CoMP transmission set, as shown in S160a-160b in FIG. 1, by sending a radio link adding request message, the RNC requests the NodeB to allocate the resource corresponding to the CoMP configuration, and the NodeB returns a radio link adding response message that carries the allocated resource corresponding to the CoMP configuration.

S170. the RNC sends the CoMP configuration corresponding to the updated CoMP transmission set (namely, new CoMP configuration) to the UE.

For example, the RNC sends a new CoMP configuration to the UE when sending an active set update message or a radio bearer reconfiguration message. The UE updates the CoMP transmission set of the UE according to the received CoMP configuration. For example, the UE adds all or part of cells corresponding to the CoMP configuration into the current CoMP transmission set of the UE or a newly created CoMP transmission set of the UE.

Optionally, the new CoMP configuration includes the CoMP configuration corresponding to all cells in the updated CoMP transmission set, or the CoMP configuration corresponding to the cells involved in the update of the CoMP transmission set.

In this embodiment, S110 and S120 are optional steps, and no definite order relationship is required between them. The process for the RNC to obtain the CoMP capability information of the NodeB and the CoMP capability information of the UE is not limited to the foregoing examples. For example, the RNC may receive a radio resource control (Radio Resource Control, RRC) Connection Setup Complete message or a UE CAPABILITY INFORMATION message, and obtain the CoMP capability information of the UE from the above message. In this embodiment, no definite order relationship is required between S160 and S170.

In this embodiment, after receiving the new CoMP configuration, the NodeB updates the transmission set of the UE, and the coordinated cell in the updated transmission set will cooperate in sending data to the UE. After receiving the new CoMP configuration, the UE will receive the data sent by all coordinated cells. The flexible adjustment of the CoMP coordinated cells is conducive to further improving the overall performance of the cell and the performance of the users at the edge of the cell.

Figure 2:
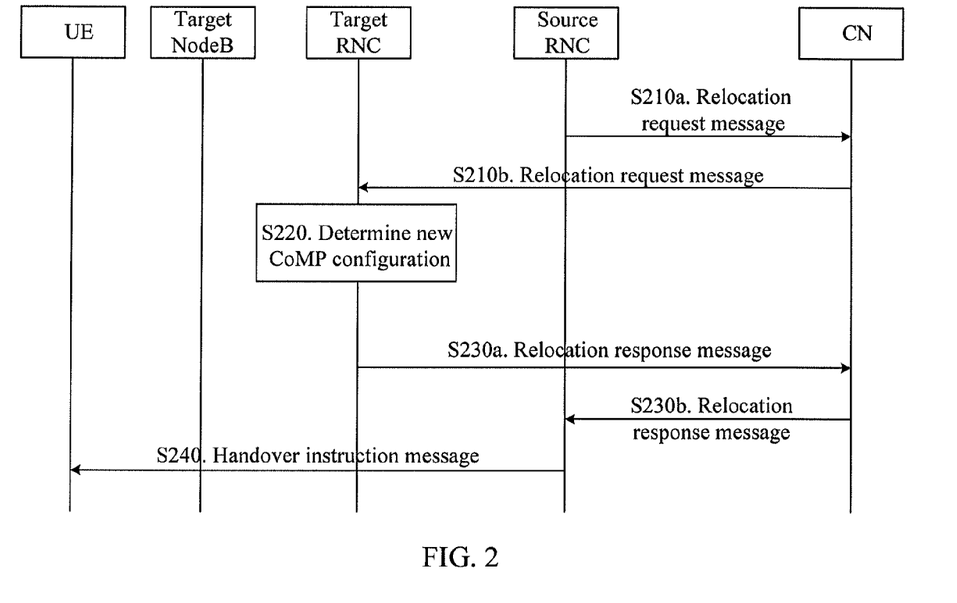
FIG. 2 is a flowchart of another update method according to another embodiment of the present invention.

As shown in FIG. 2, another embodiment of the present invention provides a method for updating a CoMP transmission set. The method in this embodiment may include the following steps:

S210. a source RNC of a UE sends information to a target RNC of the UE, where the information is used by the target RNC to determine a new CoMP configuration.

The information for the target RNC to determine the new CoMP configuration may include CoMP capability information of the UE and/or information indicating whether the UE is currently in a CoMP state.

Optionally, as shown in S210*a*-S210*b* in FIG. 2, through a core network node (CN), the source RNC of the UE sends a relocation request message that carries the information, and sends the information to the target RNC of the UE through the core network node, or, the source RNC of the UE sends the information to the target RNC of the UE directly through an Iur interface between the RNCs.

S220. the target RNC of the UE determines the new CoMP configuration.

For example, if the UE supports the CoMP mode and/or is currently in the CoMP state, the target RNC of the UE may determine the new CoMP configuration for the UE, thereby preventing adverse effect onto the user experience caused by deterioration during handover.

S230. the target RNC of the UE sends the new CoMP configuration to the source RNC of the UE.

For example, as shown in S230*a*-S230*b* in FIG. 2, through the core network node, the target RNC of the UE sends a relocation response message that carries the new CoMP configuration to transmit the new CoMP configuration to the source RNC of the UE transparently, or, the target RNC of the UE sends the new CoMP configuration to the source RNC of the UE directly through the Iur interface.

S240. the source RNC of the UE sends the new CoMP configuration to the UE.

For example, the source RNC of the UE sends a handover command message or an RRC reconfiguration message that carries the new CoMP configuration to the UE.

This embodiment is applicable to the scenario that the CoMP-supported UE hands over between different RNCs, and can update the CoMP transmission set and adjust the CoMP coordinated cells flexibly, which is conducive to further improving the overall performance of the cell and the performance of the users at the edge of the cell.

Figure 3:
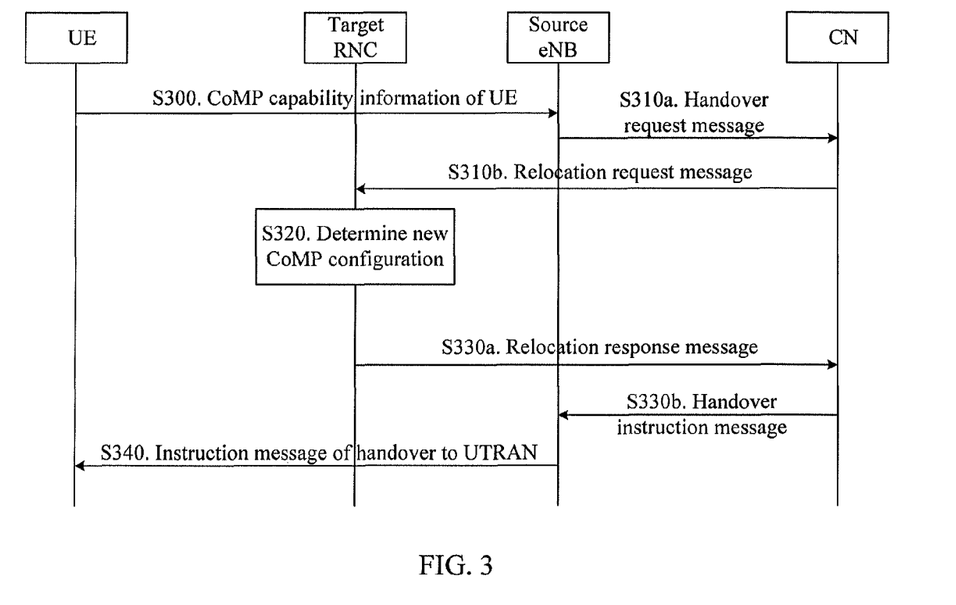
FIG. 3 is a flowchart of another update method according to another embodiment of the present invention.

As shown in FIG. 3, another embodiment of the present invention provides a method for updating a CoMP transmission set. The method in this embodiment may include the following steps:

S310. a source eNB of a UE sends information to a target RNC of the UE, where the information is used by the target RNC to determine a new CoMP configuration.

The information for the target RNC to determine the new CoMP configuration may include CoMP capability information of the UE.

Optionally, as shown in S310*a*-S310*b* in FIG. 3, the source eNB of the UE sends a handover request message that carries the information to a core network node (CN), and the core network node sends a relocation request message that carries the information to the target RNC of the UE.

Optionally, before S310, the method in this embodiment further comprises S300, namely, a source eNB of the UE receives the CoMP capability information of the UE, where the CoMP capability information includes an indication whether the UE supports the CoMP mode. For example, the eNB receives inter-RAT handover information (INTER RAT HANDOVER INFO) or inter-RAT information with inter-RAT capabilities (INTER RAT HANDOVER INFO WITH INTER RAT CAPABILITIES) sent by the UE. The above-mentioned information carries the indication that the UE supports the CoMP mode.

S320. the target RNC of the UE determines the new CoMP configuration.

For example, if the CoMP capability information of the UE includes the indication that the UE supports the CoMP mode, the target RNC of the UE may determine the new CoMP configuration for the UE, thereby preventing adverse effect onto the user experience caused by deterioration during handover.

S330. the target RNC of the UE sends the new CoMP configuration to the source eNB of the UE.

For example, as shown in S330*a*-S330*b* in FIG. 3, the target RNC of the UE sends a relocation response message that carries the new CoMP configuration to a core network node, and the core network node sends a handover command message that carries the new CoMP configuration to the source eNB of the UE.

S340. the source eNB of the UE sends the new CoMP configuration to the UE.

For example, the source eNB of the UE sends a handover command message that carries the new CoMP configuration to the UE, where the handover command message is an instruction of handing over to a UTRAN.

This embodiment is applicable to the scenario that the CoMP-supported UE hands over from the eNB to the RNC, and can update the CoMP transmission set and adjust the CoMP coordinated cells flexibly, which is conducive to further improving the overall performance of the cell and the performance of the users at the edge of the cell.

Figure 4:
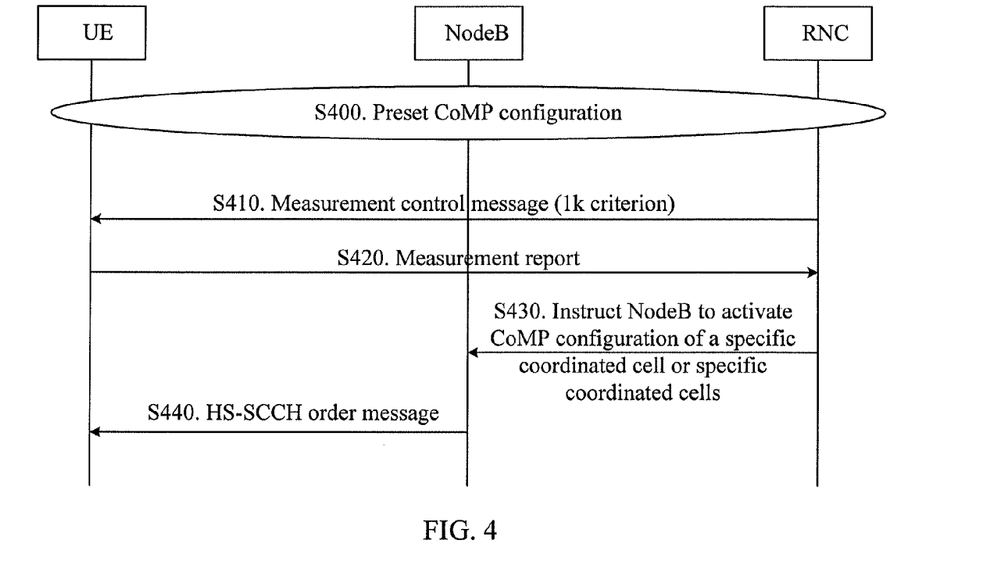
FIG. 4 is a flowchart of another update method according to another embodiment of the present invention.

As shown in FIG. 4, another embodiment of the present invention provides a method for updating a CoMP transmission set. In this method, when a cell fulfills a condition of being added into an active set, an RNC adds the cell into the active set, and pre-configures a UE's CoMP configuration for a UE and a NodeB at the same time (as shown in S400 in the figure). Therefore, the stored pre-configured CoMP configuration is the same between the UE, the NodeB, and the RNC. The CoMP cooperation set corresponding to the pre-configured CoMP configuration includes the cells capable of taking concurrent part in sending data to the UE, and may further include a downlink HSDPA configuration of the UE, an uplink HSUPA configuration of the UE, and so on. The meaning of the active set and the conditions of adding a cell into the active set in the prior art are applicable to this embodiment, and are not repeated here any further. The method in this embodiment includes the following steps:

S410. the RNC sends a MEASUREMENT CONTROL message (MEASUREMENT CONTROL) to the UE. The MEASUREMENT CONTROL message includes a 1k criterion.

S420. the UE sends the measurement report to the RNC when the 1k criterion is fulfilled.

S410-420 in this embodiment are similar to S130-S140 in other embodiments of the present invention, and S110-120 in other embodiments of the present invention may be combined with and performed before S410 of this embodiment, and are not repeated here any further.

S430. the RNC receives the measurement report, and informs the NodeB to activate the CoMP configuration of all or part of coordinated cells in the pre-configured CoMP configuration of the UE.

Optionally, the RNC decides whether to activate the pre-configured CoMP configuration according to factors such as cell quality or traffic volume, and therefore; if deciding to activate the pre-configured CoMP configuration, the RNC informs the NodeB to activate the CoMP configuration of at least one cell fulfilling the 1k criterion in the pre-configured CoMP configuration of the UE. For example, if the cell quality of a cell fulfilling the 1k criterion is not lower than a predefined threshold, and the current traffic volume is higher than a preset level, the RNC informs the NodeB to activate the CoMP configuration of the cell.

S440. the NodeB sends a high-speed shared control channel command (HS-SCCH order) message. The HS-SCCH order message is designed to activate the CoMP configuration of all or part of coordinated cells in the pre-configured CoMP configuration of the UE.

For example, the HS-SCCH order message includes an indication for activating the CoMP configuration. Optionally, the HS-SCCH order message further includes a cell identifier or index indication of the coordinated cell. The coordinated cell is an activation target cell corresponding to the activation indication. If the HS-SCCH order message does not include the information on the activation target cell corresponding to the activation indication, the CoMP configuration of all cells in the pre-configured CoMP configuration will be activated by default. That is, all cells in the CoMP cooperation set corresponding to the pre-configured CoMP configuration are added into the CoMP transmission set of the UE so that all the cells take part in the multipoint transmission.

The NodeB may send the HS-SCCH order message to the UE through a serving cell of the UE and/or the coordinated cell of the serving cell of the UE.

Optionally, in S440 in this embodiment, the NodeB may send another layer-1 message or layer-2 message that carries the activation indication rather than the HS-SCCH order message given above as an example.

Through this embodiment, the RNC decides which cells' CoMP configuration will be activated, thereby preventing the terminal from monitoring the downlink channels of all coordinated cells all the time and reducing the power consumption of the terminal.

Figure 5:
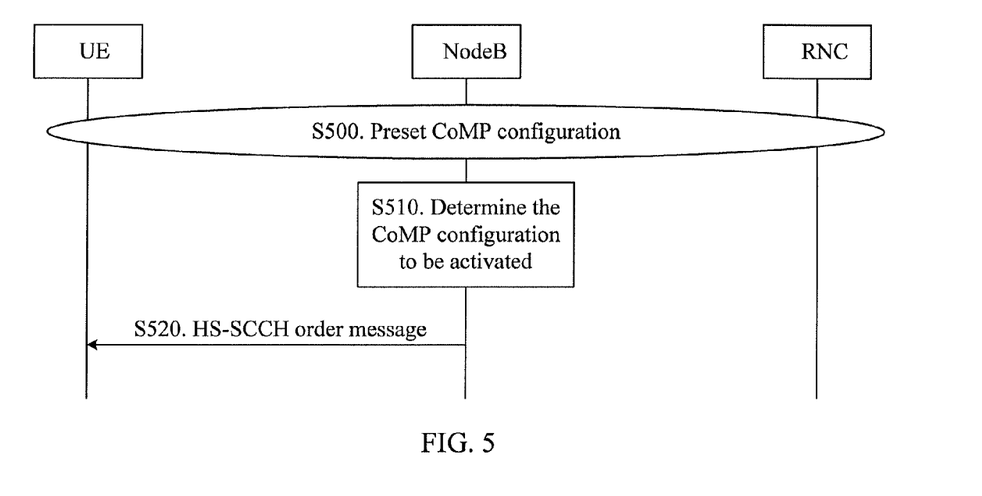
FIG. 5 is a flowchart of another update method according to another embodiment of the present invention.

Another embodiment of the present invention provides a method for updating a CoMP transmission set. In this method, when a cell fulfills a condition of being added into an active set, an RNC adds the cell into the active set, and pre-configures a UE's CoMP configuration for a UE and a NodeB at the same time (as shown in S500 in the figure). Therefore, the stored pre-configured CoMP configuration is the same between the UE, the NodeB, and the RNC. The CoMP cooperation set corresponding to the pre-configured CoMP configuration includes the cells capable of taking concurrent part in sending data to the UE, and may further include a downlink HSDPA configuration of the UE, an uplink HSUPA configuration of the UE, and so on. The method in this embodiment includes the following steps:

S510. the NodeB determines a cell or cells whose CoMP configuration needs to be activated in the pre-configured CoMP configuration of the UE.

For example, when the traffic volume of the UE is higher than a predefined threshold, the NodeB may determine the CoMP configuration to be activated, and determine a cell or cells whose CoMP configuration needs to be activated.

S520. the NodeB sends an HS-SCCH order message to the UE, where the HS-SCCH order message includes an activation indication for activating the CoMP configuration.

The NodeB may send the HS-SCCH order message to the UE through a serving cell of the UE and/or a coordinated cell of the serving cell of the UE.

Optionally, the HS-SCCH order message further includes a cell identifier or index indication of the coordinated cell. The coordinated cell is an activation target cell corresponding to the activation indication. If the HS-SCCH order message does not include the information on the activation target cell corresponding to the activation indication, the CoMP configuration of all cells in the pre-configured CoMP configuration will be activated by default. That is, all cells in the CoMP cooperation set corresponding to the pre-configured CoMP configuration are added into the CoMP transmission set of the UE, and all the cells take part in the multipoint transmission.

Figure 6A:
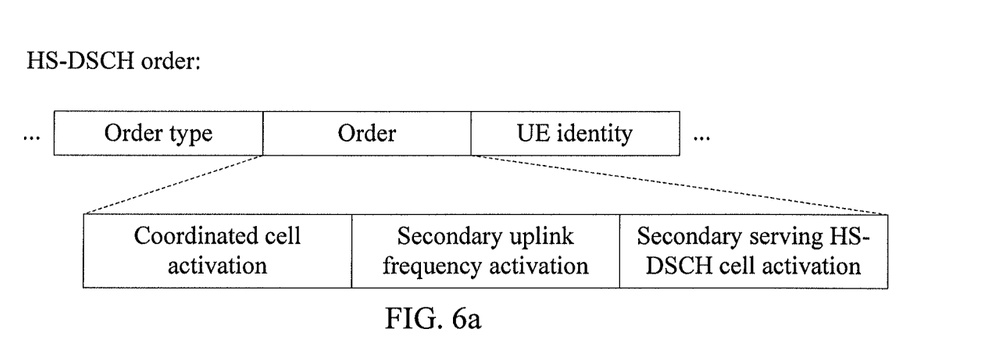
FIG. 6a is a schematic diagram of an HS-SCCH order message according to another embodiment of the present invention.

In the HS-SCCH order message shown in FIG. 6a, the "Coordinated cell activation" (coordinated cell activation) information is designed to indicate whether to activate the CoMP configuration. The "order" field in the HS-SCCH order message may include "Coordinated cell activation" information. This message may further include order type information and a UE identifier (UE identity) for indicating the type of the order (command). For example, if the value of the "Coordinated cell activation" information is 1, it indicates that the CoMP configuration needs to be activated. The order field may further include "Secondary uplink frequency activation" (secondary uplink frequency activation) information and "Secondary serving HS-DSCH cell activation" (secondary serving HS-DSCH cell activation) information.

Figure 6B:
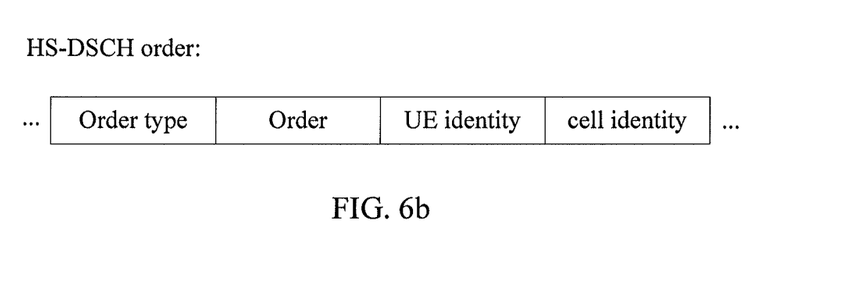
FIG. 6b is a schematic diagram of another HS-SCCH order message according to another embodiment of the present invention.

In the HS-SCCH order message shown in FIG. 6b, the "order" information is designed to indicate whether to activate the CoMP configuration. For example, if the value of the information is 1, it indicates that the CoMP configuration needs to be activated. The "cell identity" in the message includes the cell identifier or cell index of the activation target cell. If the HS-SCCH order message is sent through the serving cell of the UE, the CoMP configuration of all cells in the pre-configured CoMP configuration is activated by default. The "cell identity" in the message is null or omitted to reduce the content of the HS-SCCH order message. The HS-SCCH order message may include "order type" information and a "UE identifier" (UE identity) for indicating the type of the order (command).

Through this embodiment, the NodeB decides which cell's or which cells' CoMP configuration will be activated, thereby preventing the terminal from monitoring the downlink channels of all coordinated cells all the time and reducing the power consumption of the terminal.

In the foregoing embodiments, the HS-SCCH order message is taken as an example. However, the activation indication and/or deactivation indication in the foregoing embodiments is not necessarily carried in the HS-SCCH order message. Instead, the NodeB may send other messages that carry the activation indication and/or deactivation indication such as other layer-1 message or layer-2 message.

The HS-SCCH order message in this embodiment may also be used as an instruction of deactivating the CoMP configuration. For example, in the HS-SCCH order message shown in FIG. 6a, if the value of the "Coordinated cell activation" information is 0, the information is a deactivation indication. If the value of the "order" information in the HS-SCCH order message shown in FIG. 6b is 0, the information is a deactivation indication.

For example, the HS-SCCH order message as an indication of deactivating the CoMP configuration is applicable to the following scenario: when the current traffic volume of the UE is lower than the predefined threshold or the CQI fed back by the UE in a specific coordinated cell is lower than a preset level, the NodeB decides to deactivate the CoMP configuration of a coordinated cell or deactivate the CoMP configuration of all coordinated cells. When receiving the HS-SCCH order, the UE stops receiving downlink data from the coordinated cell. Through the method above, the NodeB decides to deactivate the pre-configured CoMP configuration or deactivate the CoMP configuration of all or part of coordinated cells in the current CoMP, thereby preventing the terminal from monitoring the downlink channels of all coordinated cells all the time and reducing the power consumption of the terminal.

All embodiments of the present invention are applicable to various systems that support the CoMP technology, including but not limited to UMTS and LTE systems.

Figure 7:
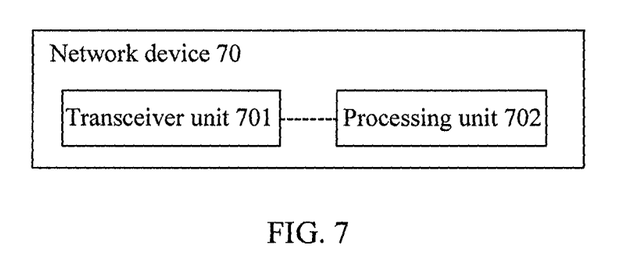
FIG. 7 is a schematic diagram of a network device according to another embodiment of the present invention.

A network device 70 is provided in another embodiment of the present invention. The network device 70 may include a transceiver unit 701 and a processing unit 702. The transceiver unit 701 is configured to send a 1k criterion to a UE, and receive a measurement report sent by the UE when the 1k criterion is fulfilled. The processing unit 702 is configured to update a CoMP transmission set of the UE according to the measurement report received by the transceiver unit 701. The 1k criterion includes any one of the following conditions for the UE to send the measurement report: quality of a cell belonging to an active set but not belonging to the CoMP transmission set is greater than quality of at least one cell in the CoMP transmission set; or, the quality of the cell belonging to the active set but not belonging to the CoMP transmission set is greater than a mean value or weighted mean value of quality of at least two cells in the CoMP transmission set. The 1k criteria provided in other embodiments of the present invention are also applicable to this embodiment, and will not be described here.

Optionally, the transceiver unit 701 is specifically configured to send a MEASUREMENT CONTROL message to the UE. The MEASUREMENT CONTROL message includes a 1k criterion and/or time information. The time information indicates the required duration of fulfilling the 1k criterion before the UE sends the measurement report.

Optionally, the transceiver unit 701 is further configured to obtain CoMP capability information of the NodeB and CoMP capability information of the UE before sending the 1k criterion to the UE. The CoMP capability information of the NodeB includes: an indication whether the NodeB supports the CoMP mode, and/or a cell identifier of a coordinated cell of the local cell of the NodeB that the UE, and/or a cell index of a coordinated cell of the local cell of the NodeB that the UE belongs to. The CoMP capability information of the UE includes an indication whether the UE supports the CoMP mode. Optionally, the transceiver unit 701 is specifically configured to receive a response message sent by the NodeB in an audit (Audit) process, where the response message carries the CoMP capability information of the NodeB. Optionally, the transceiver unit 701 is specifically configured to receive an RRC CONNECTION SETUP COMPLETE message or UE CAPABILITY INFORMATION, where the message or UE CAPABILITY INFORMATION carries the CoMP capability information of the UE and is sent by the UE.

Optionally, the measurement report received by the transceiver unit 701 includes cell quality and a cell identifier of at least one cell fulfilling the 1k criterion, or cell quality and a cell index of at least one cell fulfilling the 1k criterion.

Optionally, the processing unit 702 is specifically configured to add at least one cell fulfilling the 1k criterion into the CoMP transmission set when any one of the following conditions is fulfilled: the cell fulfilling the 1k criterion supports the CoMP mode; the QoS of the current service of the UE fulfills a predefined requirement; and the cell quality of the cell fulfilling the 1k criterion reaches a predefined threshold.

Optionally, the transceiver unit 701 is specifically configured to negotiate with the NodeB about the CoMP configuration corresponding to the updated CoMP transmission set through a radio link setup process, or a radio link reconfiguration process, or a radio link adding process. Optionally, the transceiver unit 701 is specifically configured to send the CoMP configuration corresponding to the updated CoMP transmission set to the UE through an active set update message or another radio resource control message.

Optionally, the processing unit 702 is further configured to pre-configure the UE's CoMP configuration for the UE and the NodeB. Correspondingly, the transceiver unit 701 is further configured to inform the NodeB to activate the CoMP configuration of at least one cell fulfilling the 1k criterion in the pre-configured CoMP configuration. Further, the transceiver unit 701 may be used for the NodeB to send an HS-SCCH order message to the UE, where the HS-SCCH order message is designed to activate the CoMP configuration of at least one cell fulfilling the 1k criterion in the pre-configured CoMP configuration. Activating the CoMP configuration of at least one cell in the pre-configured CoMP configuration includes: adding at least one cell fulfilling the 1k criterion in the pre-configured CoMP configuration into the CoMP transmission set of the UE.

Optionally, the transceiver unit 701 is further configured to: send information to the target RNC of the UE, where the information is designed for the target RNC to determine new CoMP configuration of the UE and includes: the CoMP capability information of the UE and/or information indicating whether the UE is currently located in a CoMP state. Further, when the network device provided in this embodiment is a source RNC of the UE, the transceiver unit 701 is further configured to: receive the UE's new CoMP configuration determined by the target RNC, and send the UE's new CoMP configuration to the UE. The UE's new CoMP configuration may be carried in a handover command message or an RRC reconfiguration message.

In this embodiment, the mode representative of the cell quality may include: received signal code power (CPICH RSCP), or chip power spectrum density (CPICH Ec/No), or path loss (CPICH PathLoss). The CoMP transmission set of the UE may include: serving cell and coordinated cells that send data to the UE; or, coordinated cells that send data to the UE.

Optionally, the network device 70 provided in this embodiment may be an RNC.

The network device provided in this embodiment can update the CoMP transmission set, and adjust the CoMP coordinated cells flexibly, which is conducive to further improving the overall performance of the cell and the performance of the users at the edge of the cell.

Figure 8:
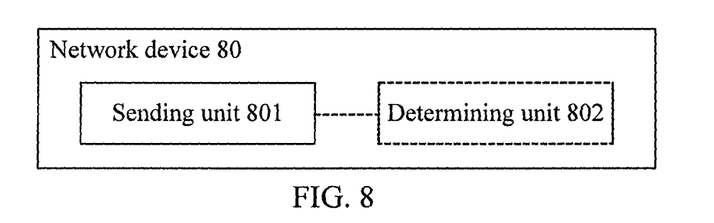
FIG. 8 is a schematic diagram of another network device according to another embodiment of the present invention.

A network device 80 is provided in another embodiment of the present invention. The network device 80 includes a sending unit 801. The sending unit 801 is configured to send an HS-SCCH order message to the UE, where the HS-SCCH order message includes an activation indication and/or a deactivation indication. The activation indication serves to activate the CoMP configuration of at least one cell in the CoMP configuration of the UE, and the deactivation indication serves to deactivate the CoMP configuration of at least one cell in the CoMP configuration of the UE.

Optionally, when the HS-SCCH order message includes the activation indication, the HS-SCCH order message further includes a cell identifier or index indication of the coordinated cell of the UE, where the coordinated cell is an activation target cell corresponding to the activation indication.

Optionally, when the HS-SCCH order message includes a deactivation indication, the HS-SCCH order message further includes a cell identifier or index indication of the coordinated cell of the UE, where the coordinated cell is a deactivation target cell corresponding to the deactivation indication.

Optionally, the sending unit 801 is specifically configured to send the HS-SCCH order message to the UE through a serving cell of the UE and/or a coordinated cell of the serving cell of the UE.

Optionally, the network device further includes a determining unit 802, which is configured to decide whether to send an activation indication and/or a deactivation indication before the sending unit 801 sends the HS-SCCH order message to the UE. For example, when the traffic volume of the UE is higher than a predefined threshold, the determining unit 802 may determine the CoMP configuration to be activated and determine a cell or cells whose CoMP configuration needs to be activated. In another example, the determining unit 802 may decide to deactivate the CoMP configuration of a coordinated cell or deactivate the CoMP configuration of all coordinated cells when the current traffic volume of the UE is lower than a predefined threshold or the CQI fed back by the UE in a specific coordinated cell is lower than a preset level.

Optionally, the network device 80 may be a NodeB.

The network device provided in this embodiment can deactivate the pre-configured CoMP configuration or deactivate the CoMP configuration of all or part of coordinated cells in the current CoMP, thereby preventing the terminal from monitoring the downlink channels of all coordinated cells all the time and reducing the power consumption of the terminal.

For more alternative methods for applying the device provided in the above embodiments, see the methods provided in other embodiments of the present invention.

Persons of ordinary skill in the art understand that all or part of the steps of the method in the embodiments of the present invention may be implemented by a program instructing relevant hardware. The program may be stored in a computer readable storage medium such as ROM/RAM, magnetic disk or CD-ROM.

The above-mentioned embodiments are only the preferred embodiments of the present invention. It is apparent that those skilled in the art can make modifications and variations without departing from the principle of the present invention, and these modifications and variations should fall in the scope of the present invention.

What is claimed is:

1. A method for updating a Coordinated Multi-Point (CoMP) transmission set, comprising: sending, by a radio network controller (RNC), a 1k criterion to a user equipment (UE); before the RNC sends the 1k criterion to the UE, pre-configuring a CoMP configuration of the UE for the UE and a NodeB; receiving, by the RNC, a measurement report sent by the UE when the 1k criterion is fulfilled; wherein the measurement report sent by the UE comprises one of: cell quality and a cell identifier of at least one cell fulfilling the 1k criterion; or cell quality and a cell index of at least one cell fulfilling the 1k criterion; updating, by the RNC, a CoMP transmission set of the UE according to the measurement report, wherein the updating comprises informing, by the RNC, the NodeB to activate the CoMP configuration of at least one cell fulfilling the 1k criterion in the pre-configured CoMP configuration; wherein the 1k criterion comprises the following condition for the UE to send the measurement report: quality of the cell belonging to the active set but not belonging to the CoMP transmission set is greater than a mean value or a weighted mean value of quality of at least two cells in the CoMP transmission set; and after informing, by the RNC, the NodeB to activate the CoMP configuration of at least one cell fulfilling the 1k criterion in the pre-configured CoMP configuration, sending, by the NodeB, a high-speed shared control channel command (HS-SCCH order) message to the UE, wherein the HS-SCCH order message is to activate the CoMP configuration of at least one cell fulfilling the 1k criterion in the preset CoMP configuration.

2. The method according to claim 1, wherein before the RNC sends the 1k criterion to the UE, the method comprises:
   obtaining, by the RNC, CoMP capability information of a NodeB and CoMP capability information of the UE,
   wherein the CoMP capability information of the NodeB comprises: an indication whether the NodeB supports a CoMP mode, or a cell identifier of a coordinated cell of a local cell of the NodeB that the UE belongs to, or a cell index of the coordinated cell of the local cell of the NodeB that the UE belongs to; and
   the CoMP capability information of the UE comprises an indication whether the UE supports the CoMP mode.

3. The method according to claim 2, wherein obtaining, by the RNC, the CoMP capability information of the NodeB comprises:
   receiving, by the RNC, an AUDIT RESPONSE message sent by the NodeB, wherein the response message carries the CoMP capability information of the NodeB.

4. The method according to claim 2, wherein obtaining, by the RNC, the CoMP capability information of the UE comprises:
   receiving, by the RNC, a RRC CONNECTION SETUP COMPLETE message sent by the UE, wherein the RRC CONNECTION SETUP COMPLETE message comprises the CoMP capability information of the UE; or
   receiving, by the RNC, a UE CAPABILITY INFORMATION message sent by the UE, wherein the UE CAPABILITY INFORMATION message comprises the CoMP capability information of the UE.

5. The method according to claim 1, wherein updating, by the RNC, the CoMP transmission set according to the measurement report comprises: adding, by the RNC, at least one cell fulfilling the 1k criterion into the CoMP transmission set when any one of the following conditions is fulfilled: a cell fulfilling the 1k criterion supports a CoMP mode; Quality of Service (QoS) of a current service of the UE fulfills a predefined requirement; and cell quality of the cell fulfilling the 1k criterion fulfills a predefined threshold.

6. The method according to claim 1, comprising:
   sending, by the RNC, information to a target RNC of the UE, wherein the information is designed for the target RNC to determine a new CoMP configuration of the UE and comprises CoMP capability information of the UE and/or information indicating whether the UE is currently located in a CoMP state.

7. The method according to claim 1, wherein the CoMP transmission set of the UE comprises one of:
   a serving cell and a coordinated cell that send data to the UE; or
   a coordinated cell that sends data to the UE.

8. A network device, comprising a sending unit, wherein the sending unit is configured to: send an activation indication to a user equipment (UE) after the network device is informed by a radio network controller (RNC) to activate CoMP configuration of at least one cell in CoMP configuration of the UE, wherein the activation indication serves to activate the CoMP configuration of at least one cell in CoMP configuration of the UE, wherein the network device is informed by the RNC after the RNC sends a 1k criterion to the UE and receives a measurement report sent by the UE when the 1k criterion is fulfilled, wherein the measurement report sent by the UE comprises one of: cell quality and a cell identifier of at least one cell fulfilling the 1k criterion; or cell quality and a cell index of at least one cell fulfilling the 1k criterion, and wherein the 1k criterion comprises the following condition for the UE to send the measurement report: quality of the cell belonging to the active set but not belonging to the CoMP transmission set is greater than a mean value or a weighted mean value of quality of at least two cells in the CoMP transmission set wherein: the sending unit is configured to send a high-speed shared control channel command (HS-SCCH order) message to the UE, wherein the HS-SCCH order message comprises the activation indication of at least one cell fulfilling the 1K criterion in the preset CoMP configuration.

9. The network device according to claim 8, wherein: the HS-SCCH order message further comprises a cell identifier or an index indication of a coordinated cell of the UE, wherein the coordinated cell is an activation target cell corresponding to the activation indication.

10. The network device according to claim 8, wherein: the sending unit is configured to send the HS-SCCH order message to the UE through a serving cell of the UE and/or a coordinated cell of the serving cell of the UE.

11. A network device, comprising a transceiver and a processor, wherein the transceiver is configured to send a 1k criterion to a user equipment (UE), and receive a measurement report sent by the UE when the 1k criterion is fulfilled, and wherein the measurement report sent by the UE comprises one of: cell quality and a cell identifier of at least one cell fulfilling the 1k criterion; or cell quality and a cell index of at least one cell fulfilling the 1k criterion; and the processor is configured to update a coordinated multipoint (CoMP) transmission set of the UE according to the measurement report received by the transceiver, wherein the processor is configured to pre-configure a CoMP of the UE configuration for the UE and the NodeB, and the updating comprises informing a NodeB to activate the CoMP configuration of at least one cell fulfilling the 1k criterion in a pre-configured CoMP configuration; and the transceiver is further configured to inform the NodeB to activate the CoMP configuration of at least one cell fulfilling the 1k criterion in the pre-configured CoMP configuration; and wherein the 1k criterion comprises following condition for the UE to send the measurement report: quality of the cell belonging to the active set but not belonging to the CoMP transmission set is greater than a mean value or a weighted mean value of quality of at least two cells in the CoMP transmission set.

12. The network device according to claim 11, wherein the transceiver is configured to obtain CoMP capability information of the NodeB and CoMP capability information of the UE before sending the 1k criterion to the UE, and
wherein the CoMP capability information of the NodeB comprises: an indication whether the NodeB supports a CoMP mode, or a cell identifier of a coordinated cell of a local cell of the NodeB that the UE belongs to, or a cell index of the coordinated cell of the local cell of the NodeB that the UE belongs to, and the CoMP capability information of the UE comprises an indication whether the UE supports the CoMP mode.

13. The network device according to claim 11, wherein the measurement report sent by the UE comprises one of:
cell quality and a cell identifier of at least one cell fulfilling the 1k criterion; or
cell quality and a cell index of at least one cell fulfilling the 1k criterion.

14. The network device according to claim 13, wherein the processor is configured to add at least one cell fulfilling the 1k criterion into the CoMP transmission set when any one of the following conditions is fulfilled:
a cell fulfilling the 1k criterion supports a CoMP mode;
Quality of Service (QoS) of a current service of the UE fulfills a predefined requirement; and
cell quality of the cell fulfilling the 1k criterion fulfills a predefined threshold.

* * * * *